United States Patent [19]

Heller et al.

[11] 4,089,797

[45] May 16, 1978

[54] CHEMILUMINESCENT WARNING CAPSULES

[75] Inventors: Carl A. Heller, China Lake; Herbert P. Richter, Ridgecrest; Rudolph J. Marcus, San Juan Capistrano, all of Calif.

[73] Assignee: The United States of America as represented by the Secretary of the Navy, Washington, D.C.

[21] Appl. No.: 779,656

[22] Filed: Mar. 21, 1977

[51] Int. Cl.² ............................................. C09K 3/00
[52] U.S. Cl. ............................ 252/188.3 CL; 89/1 A
[58] Field of Search ................ 252/188.3 CL; 89/1 A

[56] References Cited

U.S. PATENT DOCUMENTS

| | | | |
|---|---|---|---|
| 3,515,070 | 6/1970 | Cutler et al. | 252/188.3 CL |
| 3,774,022 | 11/1973 | Dubrow et al. | 252/188.3 CL |
| 3,973,466 | 8/1976 | Marcus et al. | 252/188.3 CL |

Primary Examiner—Stephen J. Lechert, Jr.
Attorney, Agent, or Firm—R. S. Sciascia; Roy Miller; Lloyd E. K. Pohl

[57] ABSTRACT

An air-reactive chemiluminescent formulation is encapsulated and material which will catalyze the reaction of the formulation with air is affixed to the outside of the capsule. When the capsule is crushed, the formulation, air and the catalyst all come into contact with one other and high intensity light is produced rapidly.

7 Claims, 1 Drawing Figure

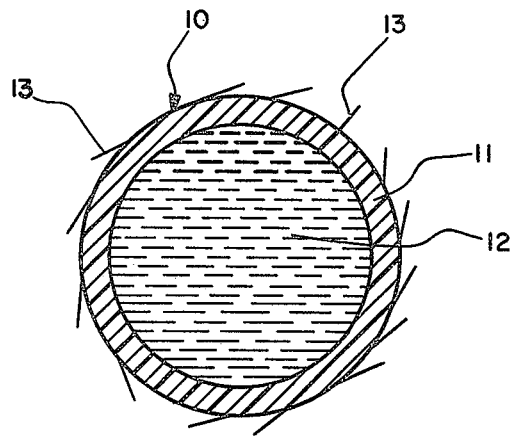

CHEMILUMINESCENT WARNING CAPSULES

BACKGROUND OF THE INVENTION

1. Field of the Invention

This invention relates to chemiluminescent devices. More particularly, this invention relates to chemiluminescent devices which may be used to detect infiltration of protected perimeters.

2. Description of the Prior Art

U.S. Pat. No. 3,973,466 which issued to Rudolph J. Marcus et al. on Aug. 10, 1976 is, insofar as is known by the inventors, the most closely related prior art. U.S. Pat. No. 3,973,466 discloses a method for detecting hostile troop movements and the like in particular areas. The method disclosed involves distributing encapsulated air-reactive chemiluminescent material in the area where detection is desirable so that when troops or the like moving across the area crush the capsules a chemiluminescent reaction will be produced.

The chemiluminescent material used by the inventors in U.S. Pat. No. 3,973,466 is tetrakisdimethylaminoethylene (TMAE). TMAE has a drawback in that its light capacity is not large. Its light capacity is only about 0.3 lumenhour-liter$^{-1}$. It would, accordingly, be advantageous if a chemiluminescent material having greater light capacity could be used in lieu of TMAE.

U.S. Pat. No. 3,850,836 to Herbert P. Richter et al. discloses chemiluminescent systems made up of (1) an organic compound selected from the group consisting of anthrahydroquinone, 2-ethylanthrahydroquinone, 2-tertiarybutylanthrahydroquinone and benzoin, (2) an oxalate ester and (3) a fluorescer. When solutions containing these three ingredients are reacted with oxygen (from the air) in the presence of a catalyst such as sodium salicylate or tetrabutylammonium salicylate high intensity light is produced rapidly. These systems have light capacities in the range of from 30-50 lumens-hours-liter$^{-1}$. Accordingly, such systems would be desirable for use in lieu of the TMAE used in U.S. Pat. No. 3,973,466. However, the use of a salicylate catalyst presents a problem in that its incorporation directly into the system tends to cause the system to decompose. It would be advantageous to omit the catalyst. However, a catalyst is necessary for rapid production of high intensity light in situations where the encapsulated material is to be used as an infiltration detection device.

SUMMARY OF THE INVENTION

According to this invention, a special capsule is provided for chemiluminescent systems made up of the aforementioned Richter et al. materials. The capsule has a catalyst incorporated on the outer surface of its wall. Thus, the catalyst and the rest of the chemiluminescent system do not come into contact until the capsule is crushed (by infiltrating troops or the like). In this way, storeage problems which are present if the catalyst is incorporated directly into the chemiluminescent solution are avoided. Glass fibers, glass beads, cracked glass or powdered glass are suitable as catalysts. Also paper fibers which have been infiltrated with one of the aforementioned salicylates may be incorporated on the outer surface of the wall so that a salicylate may be used as the catalyst.

DESCRIPTION OF THE DRAWING

The single FIGURE is a cross-sectional view of a capsule according to this invention.

DESCRIPTION OF THE PREFERRED EMBODIMENT

The invention may be readily understood by referring to the drawing. The drawing depicts, in cross-section, a warning device 10 made up of a capsule 11, a chemiluminescent system 12 within the capsule and catalytic material 13 affixed to the outside of the capsule.

The capsule 11 is roughly spherical in shape (though it could have another geometrical shape if so desired) and is made of an easily crushed material which will not react with the chemiluminescent system contained within it. A mixture of paraffin wax and ethylene-vinyl acetate copolymer (75-95 wt % wax and 5-25 wt % copolymer) has been found to be suitable as a capsule material both from the standpoint of easy crushability and from the standpoint of non-reactiveness. Encapsulation of the air-reactive chemiluminescent material may be accomplished by any of the methods set forth in U.S. Pat. No. 3,973,466.

The air reactive chemiluminescent system 12 is made up of (1) an organic compound selected from the group consisting of anthrahydroquinone, 2-ethylanthrahydroquinone, 2-tertiarybutylanthrahydroquinone, and 2-hydroxy-2-phenylacetophenone (benzoin), (2) an oxalate ester and (3) a fluorescer as described in U.S. Pat. No. 3,850,836. Suitable oxalate esters include bis(2,3,5-trichloro-6-carbobutoxyphenyl)oxalate and bis(2,4,5-trichloro-6-carbopentoxyphenyl)oxalate. Suitable fluorescers include 9,10-bis(phenylethynyl)anthracene and rubrene. Dibutylphthalate is a suitable solvent for the system. In U.S. Pat. No. 3,850,836, solutions which are 0.05M with respect to the quinone or benzoin, 0.05M with respect to the oxalate ester and $1.5 \times 10$ M with respect to the fluorescer are made up by dissolving the quinone or benzoin and the oxalate ester in a solution of the fluorescer in dibutylphthalate. Such formulations as well as others having different molar quantities of the various components are contemplated by this invention.

The catalytic material 13 may be either glass alone or paper fibers which have been impregnated with a salicylate such as sodium salicylate or tetrabutylammonium salicylate. Glass may be attached in any form having a large active surface. Soda-lime, borosilicate ore and other glasses may be used.

Paper fibers may be readily impregnated with a salicylate by contacting a solution of the salicylate with the fibers and then allowing the fibers to dry.

The catalyst (either glass or salicylate impregnated paper fiber) may be attached to the outer surface of a capsule in any convenient manner. For example, fibers, beads or powdered catalytic material may be attached by means of an adhesive. As another example, heated glass fibers or beads may be mixed with already formed capsules whereupon hot material coming into contact with the capsule surfaces will partially melt the surfaces and the catalytic material will be entrapped on or near the surface as the surface material flows around the catalytic material.

U.S. Pat. No. 3,973,466 describes a method for forming capsules wherein a liquid rod of filler material is encased within a sheath of shell solution. When the rod leaves a nozzle it breaks into capsules under the force of gravity after, which the capsules are caught in a hardening bath. Catalytic material may be affixed to the surface of capsules formed in this manner by contacting the still soft capsules with the catalytic material subsequent to the time when the capsules leave the nozzle and prior to the time when the capsules enter the hardening bath.

In operation, when a device according to this invention is crushed the formulation within the capsule is brought into substantially simultaneous contact with air and the catalytic material affixed to the outside of the capsule. When this occurs, high intensity light is produced rapidly. The amount of the light produced is in the range of from 30 to 50 lumen-hours-liter$^{-1}$ and the light can be readily observed by troops in almost any situation.

The mixture of paraffin wax and ethylene-vinyl acetate copolymer set forth above is a particularly desirable encapsulating agent for several reasons. First, it is not reactive with the air-reactive chemiluminescent formulation. Further, it withstands the conditions it will have to withstand if it is to be used in a warning situation well. That is, it withstands temperatures in the range of from about 0° C to about 40° C without deterioration and it is not soluble in water (in case of rain). Polytetrafluoro-ethylene and certain polethylenes could conceivably be used in lieu of the mixture set forth. They are also non-reactive with the chemiluminescent formulation. However, the capsules would have to be very thin-walled to provide the crushability desired.

If it is desired to insure long life once capsules have been scattered on the ground or the like to provide a warning system, it may be desirable to incorporate a brown organic dye or the like into the capsule wall. This will have the effect of filtering out sunlight during the day. Long exposure to intense sunlight tends to decompose the chemiluminescent formulations used in this invention.

What is claimed is:

1. As an article of manufacture, a device comprising a capsule, an air-reactive chemiluminescent material within the capsule and a catalytic material affixed to the outer surface of the capsule, said catalytic material being a material capable of catalyzing a reaction between the air-reactive chemiluminescent material and air.

2. An article of manufacture according to claim 1 wherein the chemiluminescent material is a formulation made up of (1) a compound selected from the group consisting of anthrahydroquinone, 2-ethylanthrahydroquinone, 2-tertiarybutylanthrahydroquinone and 2-hydroxy-2-phenylacetophenone, (2) and oxalate ester and (3) a fluorecer and wherein the catalytic material is selected from the group consisting of glass and salicylate impregnated paper fibers.

3. An article of manufacture according to claim 2 wherein said catalytic material is glass.

4. An article of manufacture according to claim 3 wherein said glass in in the form of glass fibers.

5. An article of manufacture according to claim 3 wherein said glass is in the form of glass beads.

6. An article of manufacture according to claim 3 wherein said glass is in the form of cracked glass.

7. An article of manufacture according to claim 3 wherein said glass is in the form of powdered glass.

* * * * *